E. PEARL.
HEDGE PRUNER.
APPLICATION FILED NOV. 25, 1911.

1,025,641.

Patented May 7, 1912.

2 SHEETS—SHEET 1.

Witnesses:
George Kraemer
Mary Busch

Inventor
Eugene Pearl

E. PEARL.
HEDGE PRUNER.
APPLICATION FILED NOV. 25, 1911.

1,025,641.

Patented May 7, 1912.

2 SHEETS—SHEET 2.

Witnesses:
George Kramer.
Mary Buzon

Inventor
Eugene Pearl

UNITED STATES PATENT OFFICE.

EUGENE PEARL, OF PASSAIC, NEW JERSEY.

HEDGE-PRUNER.

1,025,641.     Specification of Letters Patent.     Patented May 7, 1912.

Application filed November 25, 1911. Serial No. 662,294.

*To all whom it may concern:*

Be it known that I, EUGENE PEARL, a citizen of the United States of America, residing at Passaic, in the county of Passaic and State of New Jersey, have invented new and useful Improvements in Hedge-Pruners, of which the following is a specification.

My invention relates to improvements in hedge trimmers or pruners, and has particular reference to a power operated pruner.

In pruning hedges, it has been the common practice heretofore to use shears of various kinds, designed to be operated either by one or both hands. Owing to the limited cutting action of shears, progress is necessarily slow, the work is extremely fatiguing and the resulting in most instances, is unsatisfactory.

It is the object of the present invention to overcome these and many other well known objections, by substituting for the old type of hand-operated shears, a power driven cutter of a form requiring only to be guided, to reduce the wildest hedge growth to perfect condition and give it any shape desired.

The accompanying drawings will serve to illustrate a device suitable for carrying my invention into effect. I wish it understood, however, that I do not limit myself to the exact form or arrangement of parts shown, as various changes may be made within the meaning of the present invention.

Figure 1:
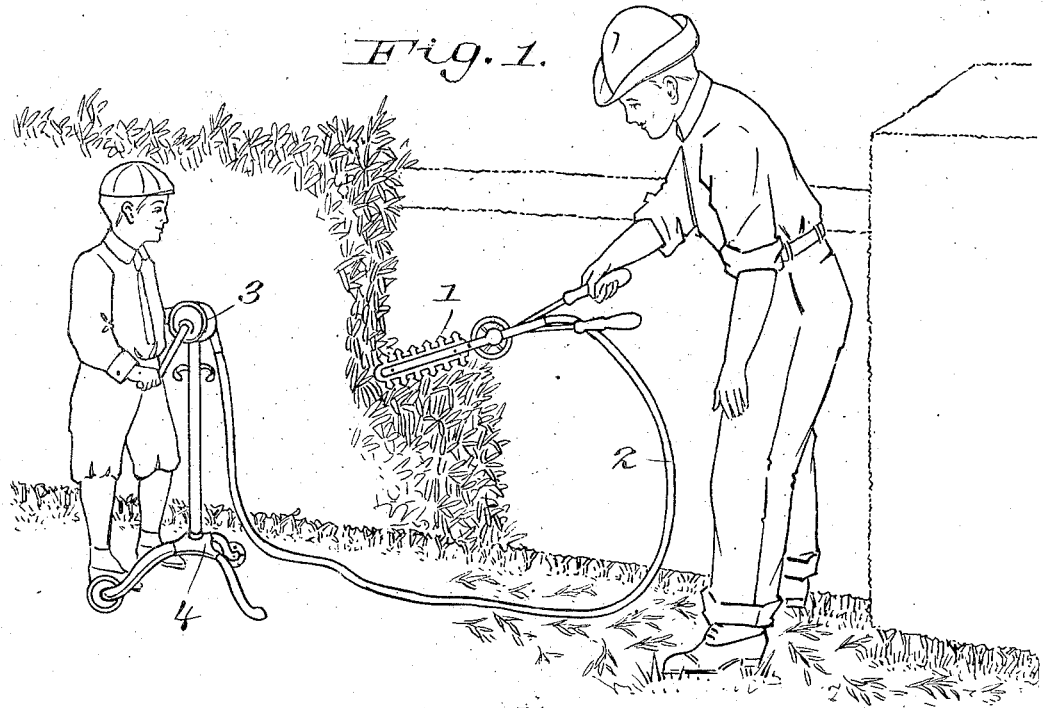
Figure 4:
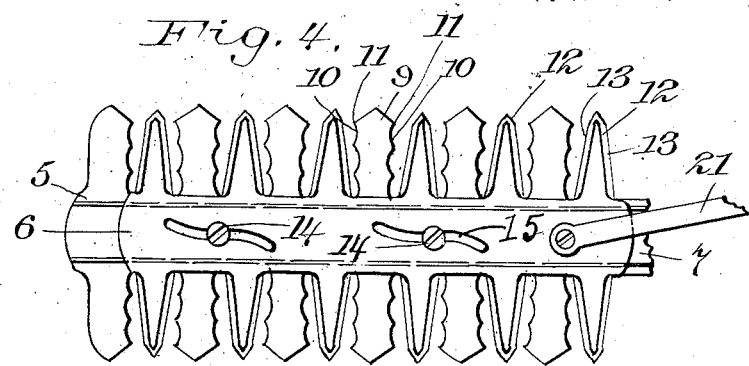
Figure 5:
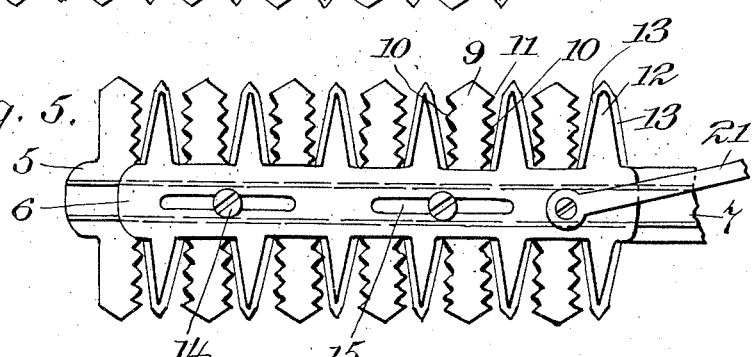
Figure 2:
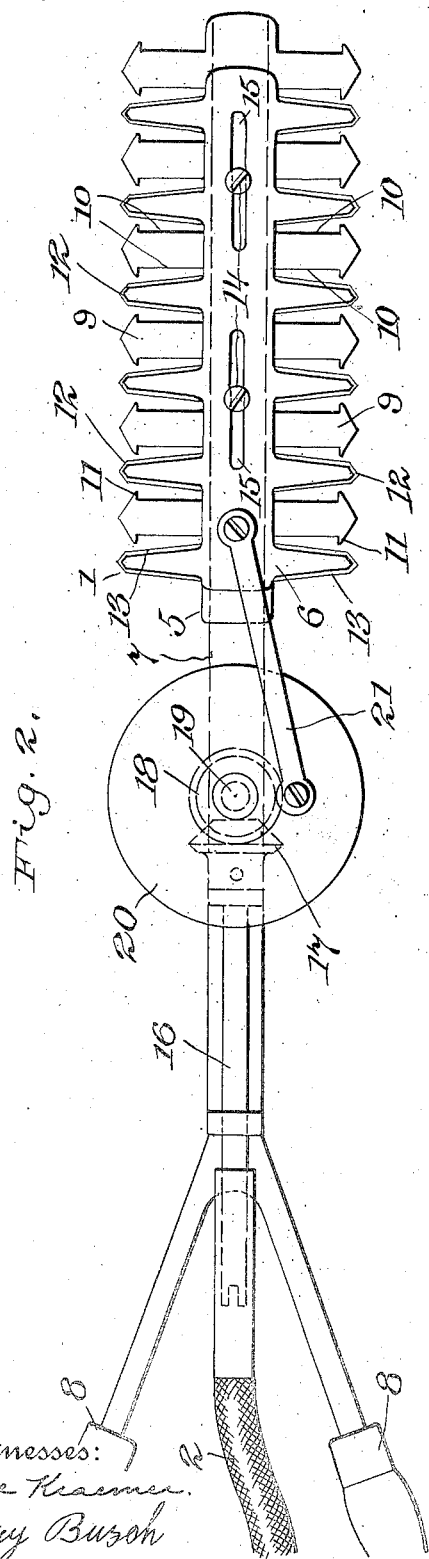
Figure 3:
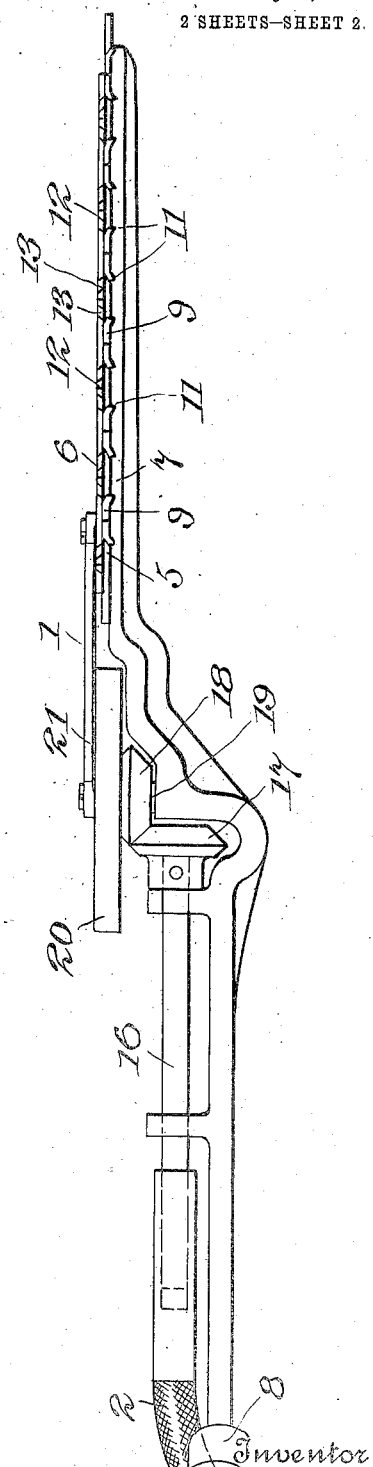

In the drawings: Figure 1 is a view in perspective showing the hedge trimmer in use. Fig. 2 is a plan view of the cutter, Fig. 3 is an edge view thereof, Fig. 4 shows a modified form of the cutter blades—and Fig. 5 illustrates a further modification of the same.

Referring now to the drawings, the hedge trimmer shown consists of a cutter 1, a flexible shaft 2, connected to drive the cutter and itself driven by either a small gasolene or electric motor or hand-operated motor 3, which for convenience in moving about, is mounted on a wheeled stand 4.

The cutter comprises a fixed bar or blade 5, and a coöperating movable bar or blade 6. The bar 5 is secured to or formed in part with the body or frame 7 of the cutter, which body or frame terminates at its inner end in two handles 8, suitably spaced apart to afford a single or double hand grip in supporting and guiding the cutter. Projecting from the sides of the bar 5, there are a series of oppositely disposed teeth 9, which are beveled to provide double cutting edges 10 and have hook-like projections 11 at their outer ends. The cutting edges 10 of the teeth may be straight, inclined or curved, or formed as shown in Figs. 4 and 5. The coöperating movable bar or blade 6, is also provided with oppositely disposed teeth 12, preferably tapering, and beveled to form double cutting edges 13.

The blade 6 is secured in position by screws 14 passing through slots 15 and thus arranged, the blade is free to move back and forth as required to cause its cutting edges to coöperate with the teeth of the bar or blade 5. By forming the slots at more or less of an angle or giving them slight curvature as in Fig. 4, the effect of a "draw-cut" will result, as will be apparent. Motion is transmitted to the blade 6 to reciprocate the same by means of gearing now to be described. Mounted on the body or frame of the cutter and free to rotate, there is a shaft 16, suitably shaped at its projecting end, for connection with the flexible shaft 2 and carrying at it opposite end, a bevel gear 17, which meshes with a similar bevel gear 18, fast on a short shaft 19. A weighted disk 20, mounted on the shaft 19, serves as a fly-wheel and also as a crank-disk, a connecting rod 21 being secured at one end thereto and having its opposite end pivotally connected to the movable blade 6, as shown.

In use, the motor, if of the hand type, is operated by one person turning the crank and the power developed, is transmitted through the flexible shaft to the shaft of the cutter, which latter, in the hand, or hands of another person is guided and directed at will. The rotation of the cutter shaft, gives motion through the intermeshing bevel gears, crank-disk and connecting-rod, to the movable blade of the cutter, causing it to reciprocate rapidly, its double edged cutting teeth co-acting with similar teeth on the stationary bar or blade 5, as above described, to sever all branches, leaves and the like caught in the spaces between the cutting teeth.

My invention differs from all others, with which I am familiar, in convenience and ease of operation, accomplishing with little or no fatigue, ten times the work done with pruners now in general use. There is no lost motion, the pruner is simply moved up and down the sides, and across the hedge top, left or right in any direction, shifting the pruner from one hand to the other, as desired, to facilitate guiding of the double cutting edges against the growth being trimmed.

By using extension handles very wide hedges are pruned across the top without temporary platforms, which are necessary when the usual hedge shears are employed.

In operating the various other devices, shears, etc. they must always be pushed forward only, to be effective, this is often very difficult and tiresome, especially so when a hedge is tall or broad on top, also when plants of various forms are being pruned. With my device the cutting blades are readily moved across the growing plants in any direction, trimming same to any form desired.

Having, therefore, described my invention, I claim:

1. A hedge-trimming tool comprising a frame provided at one end along opposite sides with laterally extending projections forming a double-edged finger-bar, the frame at the other end being bifurcated, handles fitted on the bifurcated end of the frame, a double-edged cutter-blade mounted on the frame and arranged to coöperate with the finger-bar, gearing mounted on the frame and connected to impart reciprocating motion to the cutter-blade in the direction of its length, and a driving connection in the crotch of the bifurcated end of the frame.

2. A hedge trimming tool comprising an approximately V-shaped frame having one end formed as a double-edged finger-bar and the opposite forked end thereof provided with handles, a double-edged cutter-blade mounted on the frame and coöperating with the finger-bar and having curved guide slots therein coacting with fixed studs on the frame, and gearing carried by the frame for imparting reciprocating motion to the cutter blade.

3. A hedge trimming tool comprising a frame shaped at one end as a double-edged finger bar and terminating at the opposite end in a V-shaped extension having handles fitted thereon, a double-edged cutter-blade mounted on the frame and coöperating with the finger-bar, a driving shaft mounted on and extending lengthwise of the frame, one end of the shaft projecting into the crotch of the said V-shaped extension, a gear carried by the driving shaft, a fly-wheel mounted to rotate in substantially the plane of the cutter-blade, the said fly-wheel carrying a gear meshing with the gear on the driving shaft, and a connecting rod through which motion is transmitted from the fly wheel to reciprocate the cutter-bar.

In testimony whereof I affix my signature in the presence of two witnesses.

EUGENE PEARL.

Witnesses:
GEORGE KRAEMER,
ROBERT HAGELSTEIN.